United States Patent
Ng et al.

(10) Patent No.: US 9,290,584 B2
(45) Date of Patent: Mar. 22, 2016

(54) POLYALKYLENE CARBOXYLIC ACID POLYAMINE ADDITIVES FOR FOULING MITIGATION IN HYDROCARBON REFINING PROCESSES

(75) Inventors: Man Kit Ng, Annandale, NJ (US); Glen B. Brons, Phillipsburg, NJ (US); David T. Ferrughelli, Flemington, NJ (US); Hong Cheng, Bridgewater, NJ (US); Kevin Mallory, Clinton, NJ (US); Emmanuel Ulysse, Maplewood, NJ (US); John R. Hagadorn, Houston, TX (US); Donna J. Crowther, Seabrook, TX (US); Patrick Brant, Seabrook, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 1071 days.

(21) Appl. No.: 13/176,082

(22) Filed: Jul. 5, 2011

(65) Prior Publication Data

US 2013/0008830 A1 Jan. 10, 2013

(51) Int. Cl.
*C10G 29/20* (2006.01)
*C08F 8/32* (2006.01)
(Continued)

(52) U.S. Cl.
CPC ... *C08F 8/32* (2013.01); *C08F 8/04* (2013.01); *C10G 75/04* (2013.01); *C10L 1/224* (2013.01); *C10L 1/2383* (2013.01); *C10L 10/00* (2013.01)

(58) Field of Classification Search
CPC ....... C10L 1/2383; C10L 10/00; C10L 10/04; C10L 1/222; C10L 1/2222; C10L 1/2225; C10L 1/223; C10L 1/224; C08F 8/04; C08F 8/32; C08F 10/06; C10G 29/20; C10G 29/205; C10G 75/00; C10G 75/04; C10G 7/10; C10G 1/004
USPC ............ 208/289, 48 AA; 564/123, 133–144, 564/192–197, 204
See application file for complete search history.

(56) References Cited

U.S. PATENT DOCUMENTS 3,271,295 A * 9/1966 Gonzalez ................. 208/48 AA
3,364,130 A * 1/1968 Barnum et al. .......... 208/48 AA
(Continued)

FOREIGN PATENT DOCUMENTS

EP 1283239 A1 2/2003
WO 2009155471 A8 12/2009
WO 2009155472 A8 12/2009

OTHER PUBLICATIONS

PCT International Search Report issued Sep. 14, 2012 in corresponding PCT Application No. PCT/US2012/044492, 3 pgs.
(Continued)

*Primary Examiner* — Prem C Singh
*Assistant Examiner* — Brandi M Doyle
(74) *Attorney, Agent, or Firm* — Glenn T. Barrett; Andrew T. Ward

(57) ABSTRACT

Methods and systems for reducing fouling, including particulate-induced fouling, in a hydrocarbon refining process including the steps of providing a crude hydrocarbon for a refining process and adding an antifouling agent containing a polymer base unit and a polyamine group to the crude hydrocarbon are provided. The antifouling agent can be obtained by converting a vinyl terminated polymer, such as polypropylene or poly(ethylene-co-propylene), to a terminal acyl containing functional group, followed by reacting the terminal acyl containing functional group with a polyamine compound.

34 Claims, 4 Drawing Sheets

(51) Int. Cl.

| | | |
|---|---|---|
| *C08F 8/04* | (2006.01) | |
| *C10G 75/04* | (2006.01) | |
| *C10L 1/2383* | (2006.01) | |
| *C10L 1/224* | (2006.01) | |
| *C10L 10/00* | (2006.01) | |

(56) References Cited

U.S. PATENT DOCUMENTS

| | | | | |
|---|---|---|---|---|
| 3,585,123 | A * | 6/1971 | Gordar et al. | ................ 208/308 |
| 5,616,153 | A | 4/1997 | Mike et al. | |
| 5,811,379 | A | 9/1998 | Rossi et al. | |
| 6,017,859 | A | 1/2000 | Rossi et al. | |
| 6,022,929 | A | 2/2000 | Chen et al. | |
| 2005/0276960 | A1 | 12/2005 | Lee et al. | |
| 2008/0306217 | A1 | 12/2008 | Karjala et al. | |
| 2009/0318644 | A1 | 12/2009 | Brant et al. | |
| 2009/0318646 | A1 | 12/2009 | Brant et al. | |
| 2009/0318647 | A1 | 12/2009 | Hagadorn et al. | |
| 2010/0038289 | A1 * | 2/2010 | Wang et al. | .............. 208/48 AA |
| 2010/0170829 | A1 | 7/2010 | Ng et al. | |
| 2010/0197807 | A1 * | 8/2010 | Giessler-Blank et al. | . 514/772.7 |
| 2011/0147275 | A1 | 6/2011 | Ng et al. | |

OTHER PUBLICATIONS

PCT Written Opinion issued Sep. 14, 2012 in corresponding PCT Application No. PCT/US2012/044492, 6 pgs.

* cited by examiner

POLYALKYLENE CARBOXYLIC ACID POLYAMINE ADDITIVES FOR FOULING MITIGATION IN HYDROCARBON REFINING PROCESSES

FIELD OF THE INVENTION

The presently disclosed subject matter relates to additives to reduce fouling of crude hydrocarbon refinery components, and methods and systems using the same.

BACKGROUND OF THE INVENTION

Petroleum refineries incur additional energy costs, perhaps billions per year, due to fouling and the resulting attendant inefficiencies caused by the fouling. More particularly, thermal processing of crude oils, blends and fractions in heat transfer equipment, such as heat exchangers, is hampered by the deposition of insoluble asphaltenes and other contaminants (i.e., particulates, salts, etc.) that may be found in crude oils. Further, the asphaltenes and other organics are known to thermally degrade to coke when exposed to high heater tube surface temperatures.

Fouling in heat exchangers receiving petroleum-type process streams can result from a number of mechanisms including chemical reactions, corrosion, deposit of existing insoluble impurities in the stream, and deposit of materials rendered insoluble by the temperature difference ($\Delta T$) between the process stream and the heat exchanger wall. For example, naturally-occurring asphaltenes can precipitate from the crude oil process stream, thermally degrade to form a coke and adhere to the hot surfaces. Further, the high $\Delta T$ found in heat transfer operations result in high surface or skin temperatures when the process stream is introduced to the heater tube surfaces, which contributes to the precipitation of insoluble particulates. Another common cause of fouling is attributable to the presence of salts, particulates and impurities (e.g., inorganic contaminants) found in the crude oil stream. For example, iron oxide/sulfide, calcium carbonate, silica, sodium chloride and calcium chloride have all been found to attach directly to the surface of a fouled heater rod and throughout the coke deposit. These solids promote and/or enable additional fouling of crude oils.

The buildup of insoluble deposits in heat transfer equipment creates an unwanted insulating effect and reduces the heat transfer efficiency. Fouling also reduces the cross-sectional area of process equipment, which decreases flow rates and desired pressure differentials. To overcome these disadvantages, heat transfer equipment are ordinarily taken offline and cleaned mechanically or chemically cleaned, resulting in lost production time.

Accordingly, there is a need to reduce precipitation/adherence of particulates and asphaltenes from the heated surface to prevent fouling, and before the asphaltenes are thermally degraded or coked. This will improve the performance of the heat transfer equipment, decrease or eliminate scheduled outages for fouling mitigation efforts, and reduce energy costs associated with the processing activity.

SUMMARY OF THE INVENTION

In accordance with one aspect of the presently disclosed subject matter, a method for reducing fouling in a hydrocarbon refining process is provided. The method includes providing a crude hydrocarbon for a refining process, and adding an additive to the crude hydrocarbon, the additive being represented by:

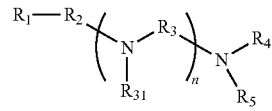

Formula I wherein $R_1$ is a branched or straight-chained $C_{10}$-$C_{800}$ alkyl or alkenyl group;

$R_2$ is

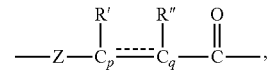

wherein the carbonyl carbon connects to nitrogen, the bond between carbons $C_p$ and $C_q$ can be either single or double bond, wherein when the bond between carbons $C_p$ and $C_q$ is a single bond, a hydrogen is attached to each of $C_p$ and $C_q$ as required by valency; R' and R" are independently H or unsubstituted or substituted $C_1$-$C_4$ alkyl or $C_1$-$C_4$ alkenyl, and Z is a bond or unsubstituted or substituted $C_1$-$C_4$ alkylene;

$R_3$ is a $C_1$-$C_{10}$ branched or straight chained alkylene group;

n is an integer from 1 to 10;

$R_4$ and $R_5$ are both independently selected from the group consisting of hydrogen and —$R_6$-$R_7$, wherein $R_6$ is defined the same as $R_2$ above, and $R_7$ is a $C_{10}$-$C_{800}$ branched or straight chained alkyl or alkenyl group, or one of $R_4$ and $R_5$ is absent as required by valency and the other of $R_4$ and $R_5$ is hydrogen or —$R_6$-$R_7$ as defined above;

$R_{31}$ is hydrogen or —$R_8$-$R_9$, wherein $R_8$ is defined the same as $R_2$ above, and $R_9$ is branched or straight-chained $C_{10}$-$C_{800}$ alkyl or alkenyl group, or $R_8$ and $R_9$ together are a $C_1$-$C_{10}$ branched or straight chained alkyl group optionally substituted with one or more amine groups;

and wherein the —$N(R_{31})$—$R_3$— repeat unit is optionally interrupted in one or more places by a heterocyclic or homocyclic cycloalkyl group.

According to another aspect of the presently disclosed subject matter, a method for reducing fouling in a hydrocarbon refining process is provided. The method includes providing a crude hydrocarbon for a refining process, and adding an additive to the crude hydrocarbon, the additive being a reaction product of (a) a polymer base unit $R_{11}$, which is a branched or straight-chained $C_{10}$-$C_{800}$ alkyl or alkenyl group having a vinyl terminal group;

(b) an acrylic compound represented by $H_2C\!=\!CH\!-\!C(O)\!-\!Y$, wherein Y is a functional group selected from halogen, —R*, —OR*, —SR*, —NR*R**, where R* and R** are both independently selected from hydrogen and substituted or unsubstituted $C_1$-$C_{10}$ alkyl or $C_1$-$C_{10}$ alkenyl, and wherein a hydrogen connecting to either of the carbons forming the double bond may be optionally replaced by a $C_1$-$C_4$ alkyl;

(c) optionally, hydrogen; and (d) a polyamine represented by the formula:

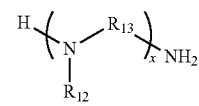

wherein $R_{12}$ is hydrogen or a $C_1$-$C_{10}$ branched or straight chained alkyl optionally substituted with one or more amine groups, $R_{13}$ is a $C_1$-$C_{10}$ branched or straight chained alkylene group, and x is an integer between 1 and 10, wherein the —N($R_{12}$)—$R_{13}$— unit is optionally interrupted in one or more places by a heterocyclic or homocyclic cycloalkyl group, and wherein when the —N($R_{12}$)—$R_{13}$— unit along with the terminal nitrogen atom forms a heterocyclic cycloalkyl group at the right terminal end, the terminal —$NH_2$ is replaced by a —NH— group as required by valency.

According to yet another aspect of the presently disclosed subject matter, a method for preparing an antifoulant useful for reducing fouling in a hydrocarbon refining process is provided. The method includes:

(a) reacting a polymer base unit $R_{11}$, which is a branched or straight-chained $C_{10}$-$C_{800}$ alkyl or alkenyl group having a vinyl terminal group, with an acrylic compound represented by $H_2C$=CH—C(O)—Y, wherein Y is a functional group selected from halogen, —R*, —OR*, —SR*, —NR*R**, wherein R* and R** are both independently selected from hydrogen and substituted or unsubstituted $C_1$-$C_{10}$ alkyl or $C_1$-$C_{10}$ alkenyl, and wherein a hydrogen connecting to either of the carbons forming the double bond may be optionally replaced by a $C_1$-$C_4$ alkyl; wherein the reaction between $R_{11}$ and the acrylic compound is a cross-metathesis reaction;

(b) optionally, hydrogenating the compound formed in (a);

(c) reacting the compound formed in (a) or (b) with a polyamine represented by

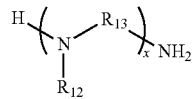

wherein $R_{12}$ is hydrogen or a $C_1$-$C_{10}$ branched or straight chained alkyl optionally substituted with one or more amine groups, $R_{13}$ is a $C_1$-$C_{10}$ branched or straight chained alkylene group, and x is an integer between 1 and 10, wherein the —N($R_{12}$)—$R_{13}$— unit is optionally interrupted in one or more places by a heterocyclic or homocyclic cycloalkyl group, and wherein when the —N($R_{12}$)—$R_{13}$— unit along with the terminal nitrogen atom forms a heterocyclic cycloalkyl group at the right terminal end, the terminal —$NH_2$ is replaced by a —NH— group as required by valency.

In addition, the presently disclosed subject matter provides the additives as described in the above methods, antifouling compositions including such additives, and systems for refining hydrocarbons containing such additives and compositions.

BRIEF DESCRIPTION OF THE DRAWINGS

The presently disclosed subject matter will now be described in conjunction with the accompanying drawings in which.

DETAILED DESCRIPTION

Definitions

Figure 1:
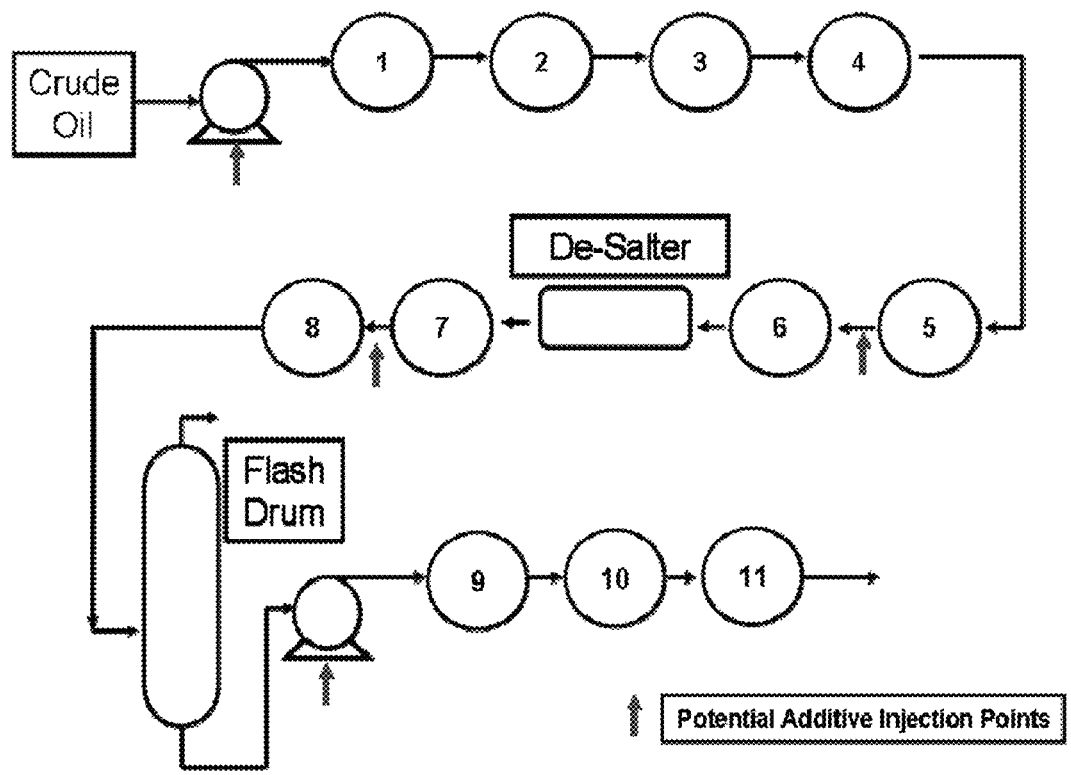
FIG. 1 is a schematic view of a representative embodiment of an oil refinery crude pre-heat train, annotated to show non-limiting injection points for the additives of the presently disclosed subject matter.

The following definitions are provided for purpose of illustration and not limitation.

As used herein, the term "fouling" generally refers to the accumulation of unwanted materials on the surfaces of processing equipment or the like, particularly processing equipment in a hydrocarbon refining process.

As used herein, the term "particulate-induced fouling" generally refers to fouling caused primarily by the presence of variable amounts of organic or inorganic particulates. Organic particulates (such as precipitated asphaltenes and coke particles) include, but are not limited to, insoluble matter precipitated out of solution upon changes in process conditions (e.g., temperature, pressure, or concentration changes) or a change in the composition of the feed stream (e.g., changes due to the occurrence of a chemical reaction). Inorganic particulates include, but are not limited to, silica, iron oxide, iron sulfide, alkaline earth metal oxide, sodium chloride, calcium chloride and other inorganic salts. One major source of these particulates results from incomplete solids removal during desalting and/or other particulate removing processes. Solids promote the fouling of crude oils and blends due to physical effects by modifying the surface area of heat transfer equipment, allowing for longer holdup times at wall temperatures and causing coke formation from asphaltenes and/or crude oil(s).

As used herein, the term "alkyl" refers to a monovalent hydrocarbon group containing no double or triple bonds and arranged in a branched or straight chain.

As used herein, the term "alkylene" refers to a divalent hydrocarbon group containing no double or triple bonds and arranged in a branched or straight chain.

As used herein, the term "alkenyl" refers to a monovalent hydrocarbon group containing one or more double bonds and arranged in a branched or straight chain.

As used herein, a "hydrocarbyl" group refers to any univalent radical that is derived from a hydrocarbon, including univalent alkyl, aryl and cycloalkyl groups.

As used herein, "carboxylic acid amine" refers to a chemical structure where an acyl group is connected to an amine via a carbon-nitrogen bond.

As used herein, the term "crude hydrocarbon refinery component" generally refers to an apparatus or instrumentality of a process to refine crude hydrocarbons, such as an oil refinery process, which is, or can be, susceptible to fouling. Crude hydrocarbon refinery components include, but are not limited to, heat transfer components such as a heat exchanger, a furnace, a crude preheater, a coker preheater, or any other heaters, a FCC slurry bottom, a debutanizer exchanger/tower, other feed/effluent exchangers and furnace air preheaters in refinery facilities, flare compressor components in refinery facilities and steam cracker/reformer tubes in petrochemical facilities. Crude hydrocarbon refinery components can also include other instrumentalities in which heat transfer can take place, such as a fractionation or distillation column, a scrubber, a reactor, a liquid-jacketed tank, a pipestill, a coker and a visbreaker. It is understood that "crude hydrocarbon refinery components," as used herein, encompasses tubes, piping, baffles and other process transport mechanisms that are internal to, at least partially constitute, and/or are in direct fluid communication with, any one of the above-mentioned crude hydrocarbon refinery components.

As used herein, a reduction (or "reducing") particulate-induced fouling is generally achieved when the ability of particulates to adhere to heated equipment surfaces is reduced, thereby mitigating their impact on the promotion of the fouling of crude oil(s), blends, and other refinery process streams.

As used herein, reference to a group being a particular polymer (e.g., polypropylene or poly(ethylene-co-propylene) encompasses polymers that contain primarily the respective monomer along with negligible amounts of other substitutions and/or interruptions along polymer chain. In other words, reference to a group being a polypropylene group does not require that the group consist of 100% propylene monomers without any linking groups, substitutions, impurities or other substituents (e.g., alkylene or alkenylene substituents). Such impurities or other substituents can be present in relatively minor amounts so long as they do not significantly affect the industrial performance of the additive, as compared to the same additive containing the respective polymer substituent with 100% purity.

For the purposes of the presently disclosed subject matter and the claims thereto when a polymer is referred to as comprising or including an olefin, the olefin present in the polymer is the polymerized form of the olefin.

As used herein, a copolymer is a polymer comprising at least two different monomer units (such as propylene and ethylene). A homo-polymer is a polymer comprising units of the same monomer (such as propylene).

The term "vinyl termination", also referred to as "allyl chain end(s)" or "vinyl content" refers to a polymer having at least one terminus represented by formula:

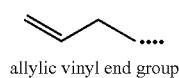

allylic vinyl end group where the "••••" represents the polymer chain.

In one embodiment, the allyl chain end is represented by the formula:

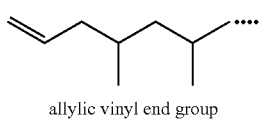

allylic vinyl end group

The amount of allyl chain ends (also called % vinyl termination) can be determined using $^1H$ NMR at 120° C. using deuterated tetrachloroethane as the solvent on a 500 MHz machine and can be confirmed by $^{13}C$ NMR. Resconi has reported proton and carbon assignments for vinyl terminated propylene polymers in J. Am. Chem. Soc. 1992, 114, 1025-1032. Janiak has also described $^1H$ NMR assignments for polypropylenes with allylic end group in Coordination Chemistry Reviews 2006, vol. 250, pp. 66-94, hereby incorporated by reference in its entirety, which are useful for the presently disclosed subject matter.

"Isobutyl chain end" is defined to be a polymer having at least one terminus represented by the formula:

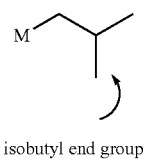

isobutyl end group where M represents the polymer chain. In one embodiment, the isobutyl chain end is represented by one of the following formulae:

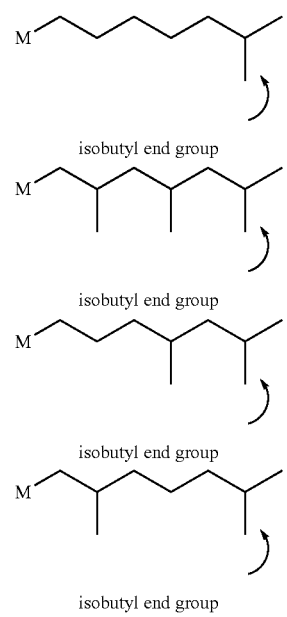

where M represents the polymer chain.

The percentage of isobutyl end groups is determined using $^{13}C$ NMR (as described in the example section of U.S. patent application Ser. No. 12/488,066, filed Jun. 19, 2009, and published as US20090318640) and the chemical shift assignments in Resconi et al, J. Am. Chem. Soc. 1992, 114, 1025-1032 for 100% propylene polymers and set forth in FIG. 2 for E-P polymers, the disclosure of each of which is incorporated by reference in its entirety.

The "isobutyl chain end to allylic vinyl group ratio" is defined to be the ratio of the percentage of isobutyl chain ends to the percentage of allylic vinyl groups.

A reaction zone is any vessel where a reaction occurs, such as glass vial, a polymerization reactor, reactive extruder, tubular reactor and the like.

As used herein, the term "polymer" refers to a chain of monomers having a Mn of at least 80 g/mol, preferably greater than 100 g/mol and more preferably greater than 120 g/mol.

Reference will now be made to various aspects of the presently disclosed subject matter in view of the definitions above.

The techniques provided herein are based, at least in part, on interactions between the antifouling additives according to the presently disclosed subject matter and the materials in crude oils that are prone to cause fouling, e.g., particulate impurities/contaminants and asphaltenes. The interaction can be of physical or chemical means such as, but not limited to, absorption, association, or chemical bonding. The fouling materials can be rendered more soluble in the crude oils as a result of interaction with the antifouling additives, therefore the fouling on the exchanger metal surfaces can be reduced or eliminated.

The systems, methods and compounds of the presently disclosed subject matter are described below in conjunction with each other. For example, the various embodiments directed to the antifoulant compounds, may they be described structurally or products of processes, should be understood as applicable for the disclosed methods and the systems for reducing fouling.

In accordance with one aspect of the presently disclosed subject matter, a method is provided for reducing fouling. The method includes providing a crude hydrocarbon for a refining process, and adding to the crude hydrocarbon one or more additives (also referred to as antifouling agent or antifoulant) selected from:

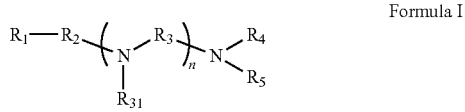

Formula I wherein $R_1$ is a branched or straight-chained $C_{10}$-$C_{800}$ alkyl or alkenyl group;
$R_2$ is

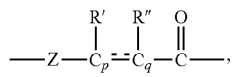

wherein the carbonyl carbon connects to nitrogen, the bond between carbons $C_p$ and $C_q$ can be either single or double bond, wherein when the bond between carbons $C_p$ and $C_q$ is a single bond, a hydrogen is attached to each of $C_p$ and $C_q$ as required by valency; R' and R" are independently H or unsubstituted or substituted $C_1$-$C_4$ alkyl or $C_1$-$C_4$ alkenyl and Z is a bond or unsubstituted or substituted $C_1$-$C_4$ alkylene;

$R_3$ is a $C_1$-$C_{10}$ branched or straight chained alkylene group;
n is an integer from 1 to 10;

$R_4$ and $R_5$ are both independently selected from the group consisting of hydrogen and —$R_6$-$R_7$, wherein $R_6$ is defined the same as $R_2$ above, and $R_7$ is a $C_{10}$-$C_{800}$ branched or straight chained alkyl or alkenyl group, or one of $R_4$ and $R_5$ is absent as required by valency and the other of $R_4$ and $R_5$ is hydrogen or —$R_6$-$R_7$ as defined above;

$R_{31}$ is hydrogen or —$R_8$-$R_9$, wherein $R_8$ is defined the same as $R_2$ above, and $R_9$ is branched or straight-chained $C_{10}$-$C_{800}$ alkyl or alkenyl group, or $R_8$ and $R_9$ together are a $C_1$-$C_{10}$ branched or straight chained alkyl group optionally substituted with one or more amine groups;

and wherein the —N($R_{31}$)—$R_3$— repeat unit is optionally interrupted in one or more places by a heterocyclic or homocyclic cycloalkyl group.

In certain embodiments, at least one of $R_1$, $R_7$, and $R_9$ of Formula I includes polypropylene (PP). The polypropylene can be amorphous polypropylene or polypropylene comprising crystallizable units. For example, the polypropylene can be atactic, syndiotactic, or isotactic. The polypropylene can also include units or portions that are syndiotactic, and/or units or portions that are isotactic. In one embodiment, the meso diads in the polypropylene constitute from about 30% to about 99.5% of the total diads of the polypropylene. In an alternative embodiment, at least one of $R_1$, $R_7$, and $R_9$ of the additive of Formula I includes polyethylene (PE).

In a further embodiment, at least one of $R_1$, $R_7$, and $R_9$ of the additive of Formula I includes poly(ethylene-co-propylene) (EP). The mole percentage of the ethylene units and propylene units in the poly(ethylene-co-propylene) can vary. For example, in some embodiments, the poly(ethylene-co-propylene) can contain about 1 to about 90 mole % of ethylene units and about 99 mole % to about 10 mole % propylene units. In other embodiments, the poly(ethylene-co-propylene) can contain about 10 mole % to about 90 mole % of ethylene units and about 90 mole % to about 10 mole % propylene units. In certain embodiments, the poly(ethylene-co-propylene) contains about 20 mole % to about 50 mole % of ethylene units.

In some embodiments of the above method, at least one of $R_1$, $R_7$, and $R_9$ of the additive of Formula I has a number-averaged molecular weight of from about 300 to about 30,000 g/mol (assuming one olefin unsaturation per chain, as measured by $^1$H NMR). Alternatively, at least one of $R_1$, $R_7$, and $R_9$ of the additive of Formula I has a number-averaged molecular weight of from about 500 to about 5,000 g/mol. In one embodiment, the PP or EP included in the $R_1$, $R_7$ or $R_9$ of the additive Formula I, individually, have a molecular weight from about 300 to about 30,000 g/mol, or from about 500 to about 5000 g/mol. In one embodiment, the PP or EP groups have a molecular weight, individually, ranging from about 500 to about 2500 g/mol, or a molecular weight of from about 500 to about 650 g/mol, or a molecular weight of from about 800 to about 1000 g/mol, or a molecular weight of from about 1000 to about 1500 g/mol, or a molecular weight of from about 1500 to about 2000 g/mol, or a molecular weight of from about 2000 to about 2500 g/mol.

In particular embodiments, in the additive of Formula I in the above method, $R_1$ is poly(ethylene-co-propylene), $R_3$ is —$CH_2CH_2$—, $R_{31}$ is hydrogen, and $R_4$ and $R_5$ are both hydrogen. In one embodiment, $R_2$ is —$CH_2$—$CH_2$—C(O)—.

In certain embodiments of the above method, the nitrogen content in the additive of Formula I is about 1 wt % to about 10 wt % based on the total weight of the additive.

In accordance with another aspect of the presently disclosed subject matter, a method is provided for reducing fouling. The method includes providing a crude hydrocarbon for a refining process, and adding to the crude hydrocarbon one or more additives which are a reaction product of (a) a polymer base unit $R_{11}$, which is a branched or straight-chained $C_{10}$-$C_{800}$ alkyl or alkenyl group having a vinyl terminal group;

(b) an acrylic compound represented by $H_2C$=$CH$—C(O)—Y, wherein Y is a functional group selected from halogen, —R*, —OR*, —SR*, —NR*R**, where R* and R** are both independently selected from hydrogen and substituted or unsubstituted $C_1$-$C_{10}$ alkyl or $C_1$-$C_{10}$ alkenyl, and wherein a hydrogen connecting to either of the carbons forming the double bond may be optionally replaced by a $C_1$-$C_4$ alkyl;

(c) optionally, hydrogen; and (d) a polyamine represented by the formula:

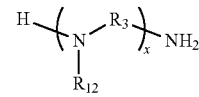

wherein $R_{12}$ is hydrogen or a $C_1$-$C_{10}$ branched or straight chained alkyl optionally substituted with one or more amine groups, $R_{13}$ is a $C_1$-$C_{10}$ branched or straight chained alkylene group, and x is an integer between 1 and 10, wherein the —N($R_{12}$)—$R_{13}$— unit is optionally interrupted in one or more places by a heterocyclic or homocyclic cycloalkyl group, and wherein when the —N($R_{12}$)—$R_{13}$— unit along with the terminal nitrogen atom forms a heterocyclic cycloalkyl group at the right terminal end, the terminal —$NH_2$ is replaced by a —NH— group as required by valency.

In certain embodiments of the above method, the polymer base unit $R_{11}$ has a number-averaged molecular weight of 300 to 30,000 g/mol (assuming one olefin unsaturation per chain, as measured by $^1$H NMR), and alternatively, about 500 to 5,000 g/mol.

In some embodiments of the above method, the polymer base unit $R_{11}$ includes polypropylene. The polypropylene can be amorphous polypropylene or polypropylene comprising crystallizable units. For example, the polypropylene can be atactic, syndiotactic, or isotactic. The polypropylene can also include units or portions that are syndiotactic, and/or units or portions that are isotactic. In one embodiment, the meso diads in the polypropylene constitute from about 30% to about 99.5% of the total diads of the polypropylene. The polymer base unit $R_{11}$ can also include polyethylene.

In alternative embodiments, the polymer base unit $R_{11}$ includes poly(ethylene-co-propylene). The poly(ethylene-co-propylene) can contain from about 1 or 10 mole % to about 99 or 90 mole % of ethylene units and from about 99 or 90 mole % to about 1 or 10 mole % propylene units. In one embodiment, the poly(ethylene-co-propylene) polymer contains from about 2 or 20 mole % to about 50 mole % ethylene units.

In one embodiment, the PP or EP included in the $R_{11}$ of the additive Formula I, individually, have a number-averaged molecular weight ($M_n$) molecular weight from about 300 to about 30,000 g/mol, or from about 500 to about 5000 g/mol (assuming one olefin unsaturation per chain, as measured by $^1$H NMR). In one embodiment, the PP or EP groups have a molecular weight, individually, ranging from about 500 to about 2500 g/mol, or a molecular of from about 500 to about 650 g/mol, or a molecular weight of from about 800 to about 1000 g/mol, or a molecular weight of from about 1000 to about 1500 g/mol, or a molecular weight of from about 1500 to about 2000 g/mol, or a molecular weight of from about 2000 to about 2500 g/mol.

In embodiments where the polymer base unit $R_{11}$, include polypropylene or poly(ethylene-co-propylene), such groups can be prepared, for example, by metallocene-catalyzed polymerization of propylene or a mixture of ethylene and propylene, which are then terminated with a high vinyl group content in the chain end. The number-averaged molecular weight ($M_n$) of the PP or EP can be from about 300 to about 30,000 g/mol, as determined by $^1$H NMR spectroscopy. The vinyl-terminated polypropylenes (v-PP) or vinyl-terminated poly (ethylene-co-propylene) (v-EP) suitable for further chemical functionalization can have a molecular weight ($M_n$) approximately from about 300 to about 30,000 g/mol, or about 500 to 5,000 g/mol. The terminal olefin group can be a vinylidene group or an allylic vinyl group. In certain embodiments, the terminal olefin group is an allylic vinyl group.

In another embodiment, one or more of the $R_1$, $R_7$ and $R_9$ groups is independently selected from propylene polymers comprising propylene and less than 1.0 wt % comonomer, for example, 0 wt % comonomer, wherein the polymer has:
  i) at least 70% allyl chain ends, preferably at least 75% allyl chain ends, more preferably at least 80% allyl chain ends, even more preferably at least 90% allyl chain ends, and even more preferably at least 95% allyl chain ends, (for example, at least 95%, or at least 97%, or at least 98%);
  ii) a number average molecular weight (Mn) of from about 500 to about 20,000 g/mol, as measured by $^1$H NMR, assuming one olefin unsaturation per chain (for example, from about 500 to about 15,000 g/mol, or from about 700 to about 10,000 g/mol, or from 800 to about 8,000 g/mol, or from about 900 to about 7,000 g/mol, or from about 1000 to about 6,000 g/mol, or from about 1,000 to about 5,000);
  iii) an isobutyl chain end to allylic vinyl group ratio of 0.7:1 to 1.4:1.0;
  iv) less than 1400 ppm aluminum (for example, less than 1200 ppm, or less than 1000 ppm, or less than 500 ppm, or less than 100 ppm).

In another embodiment, one or more of the $R_1$, $R_7$ and $R_9$ groups is independently selected from the group consisting of propylene copolymers having an Mn of 300 to 30,000 g/mol as measured by $^1$H NMR and assuming one olefin unsaturation per chain (for example, from about 400 to about 20,000 g/mol, or from about 500 to about 15,000 g/mol, or from about 600 to about 12,000 g/mol, or from about 800 to about 10,000 g/mol, or from about 900 to about 8,000 g/mol, or from about 900 to about 7,000 g/mol), including from about 10 to about 90 mol % propylene (for example, 15 to 85 mol %, or 20 to 80 mol %, or 30 to 75 mol %, or 50 to 90 mol %) and 10 to 90 mol % (for example, 85 to 15 mol %, or 20 to 80 mol %, or 25 to 70 mol %, or 10 to 50 mol %) of one or more alpha-olefin comonomers (for example, ethylene, butene, hexene, or octene, and preferably ethylene), wherein the polymer has at least 70% allyl chain ends, preferably at least 80% allyl chain ends, more preferably at least 85% allyl chain ends, even more preferably at least 90% allyl chain ends, and even more preferably at least 95% allyl chain ends.

Alternatively, the polymer or copolymer has at least 80% isobutyl chain ends (based upon the sum of isobutyl and n-propyl saturated chain ends), or at least 85% isobutyl chain ends, or at least 90% isobutyl chain ends. Alternately, the polymer has an isobutyl chain end to allylic vinyl group ratio of 0.7:1 to 1.3:1.0, or 0.8:1 to 1.40:1.0, or 0.9:1.0 to 1.1:1.0.

In another embodiment, one or more of the $R_1$, $R_7$ and $R_9$ groups is independently selected from the group consisting of propylene polymers, comprising more than 90 mol % propylene (for example, 95 to 99 mol %, or 98 to 9 mol %) and less than 10 mol % ethylene (for example, 1 to 4 mol %, or 1 to 2 mol %), wherein the polymer has:
  at least 93% allyl chain ends (or at least 95%, or at least 97%, or at least 98%);
  a number average molecular weight (Mn) of about 400 to about 30,000 g/mol, as measured by $^1$H NMR and assuming one olefin unsaturation per chain (for example, 500 to 20,000 g/mol, or 600 to 15,000 g/mol, or 700 to 10,000 g/mol, or 800 to 9,000 g/mol, or 900 to 8,000 g/mol, or 1000 to 6,000 g/mol);
  an isobutyl chain end to allylic vinyl group ratio of 0.8:1 to 1.35:1.0, and
  less than 1400 ppm aluminum, (for example, less than 1200 ppm, or less than 1000 ppm, or less than 500 ppm, or less than 100 ppm).

In another embodiment, one or more of the $R_1$, $R_7$ and $R_9$ groups is independently selected from the group consisting of propylene polymers comprising:
  at least 50 (for example, 60 to 90, or 70 to 90) mol % propylene and from 10 to 50 (for example, 10 to 40, or 10 to 30) mol % ethylene, wherein the polymer has:

at least 90% allyl chain ends (or at least 91%, or at least 93%, or at least 95%, or at least 98%);

an Mn of about 150 to about 20,000 g/mol, as measured by $^1$H NMR and assuming one olefin unsaturation per chain (for example, 200 to 15,000 g/mol, or 250 to 15,000 g/mol, or 300 to 10,000 g/mol, or 400 to 9,500 g/mol, or 500 to 9,000 g/mol, or 750 to 9,000 g/mol); and an isobutyl chain end to allylic vinyl group ratio of 0.8:1 to 1.3:1.0, wherein monomers having four or more carbon atoms are present at from 0 to 3 mol % (for example, at less than 1 mol %, or less than 0.5 mol %, or at 0 mol %).

In another embodiment, one or more of the $R_1$, $R_7$ and $R_9$ groups is independently selected from the group consisting of propylene polymers comprising:

at least 50 (or at least 60, or 70 to 99.5, or 80 to 99, or 90 to 98.5) mol % propylene, from 0.1 to 45 (for example, at least 35, or 0.5 to 30, or 1 to 20, or 1.5 to 10) mol % ethylene, and from 0.1 to 5 (or 0.5 to 3, or 0.5 to 1) mol % $C_4$ to $C_{12}$ olefin (such as butene, hexene or octene, preferably butene), wherein the polymer has:

at least 90% allyl chain ends (or at least 91%, or at least 93%, or at least 95%, or at least 98%);

a number average molecular weight (Mn) of about 150 to about 15,000 g/mol, as measured by $^1$H NMR and assuming one olefin unsaturation per chain (for example, 200 to 12,000 g/mol, or 250 to 10,000 g/mol, or 300 to 10,000 g/mol, or 400 to 9500 g/mol, or 500 to 9,000 g/mol, or 750 to 9,000 g/mol); and an isobutyl chain end to allylic vinyl group ratio of 0.8:1 to 1.35:1.0.

In another embodiment, one or more of the $R_1$, $R_7$ and $R_9$ groups is independently selected from the group consisting of propylene polymers comprising:

at least 50 (or at least 60, or 70 to 99.5, or 80 to 99, or 90 to 98.5) mol % propylene, from 0.1 to 45 (for example, at least 35, or 0.5 to 30, or 1 to 20, or 1.5 to 10) mol % ethylene, and from 0.1 to 5 (or 0.5 to 3, or 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has:

at least 90% allyl chain ends (or at least 91%, or at least 93%, or at least 95%, or at least 98%);

a number average molecular weight (Mn) of about 150 to about 20,000 g/mol, as measured by $^1$H NMR and assuming one olefin unsaturation per chain (for example, 200 to 15,000 g/mol, or 250 to 12,000 g/mol, or 300 to 10,000 g/mol, or 400 to 9,500 g/mol, or 500 to 9,000 g/mol, or 750 to 9,000 g/mol); and an isobutyl chain end to allylic vinyl group ratio of 0.7:1 to 1.35:1.0.

Any of the propylene polymers prepared herein can have less than 1400 ppm aluminum, or less than 1000 ppm aluminum, or less than 500 ppm aluminum, or less than 100 ppm aluminum, or less than 50 ppm aluminum, or less than 20 ppm aluminum, or less than 5 ppm aluminum.

The terminal allylic vinyl functionality in the PP or EP described above can be initially prepared by metallocene-catalyzed polymerization of propylene, or a mixture of ethylene and propylene, to produce polypropylenes or ethylene-propylene copolymers terminated with a high vinyl group content in the chain end. See Scheme 1 below. Such techniques for preparation of terminal allylic vinyl PP or EP are described in patent application publications US20090318644, US20090318646, WO20091555471, WO20091555472 by Brant et al., the disclosure each of which is incorporated herein by reference in its entirety.

Scheme 1. Metallocene-Catalyzed Synthesis of High Vinyl-Terminated Propylene Based Oligomers.

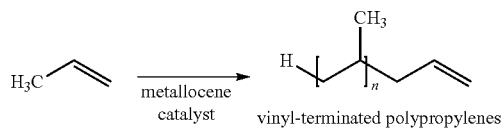

The terminal vinyl functionality (an alpha-olefin) in these polypropylenes can undergo cross metathesis reaction with a wide variety of vinyl compounds bearing polar functional groups (e.g., acrylic acid, methacrylic acid, methyl acrylate, methyl methacrylate, acrylonitrile, etc.) in the presence of a suitable olefin cross metathesis catalyst such as, but not limited to, ruthenium- or molybdenum-based carbene complexes to afford the corresponding cross-metathesized polypropylene derivatives functionalized with polar functionalities in the chain end.

As an illustration, a selective cross metathesis reaction between two olefinically unsaturated vinyl type compounds (for example, R—CH=$CH_2$ and X—CH=$CH_2$, where R is an alkyl, aryl, alkylaryl, arylalkyl or polyolefin group and X is a polar functional group such as carboxylic acid, ester, amide, nitrile or ether) will lead to the generation of ethylene (a by-product) and predominantly a mixture of cis- and trans-internal olefin products as represented by the chemical formula R—CH=CH—X that preserves a single olefinic (C=C) bond) unsaturation (Scheme 2).

Scheme 2. Selective Cross Metathesis of Terminal Olefins

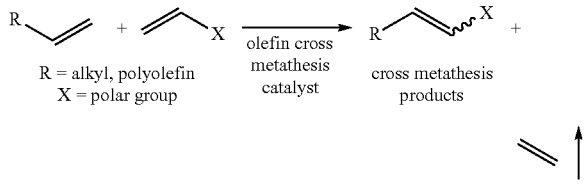

Examples of the chemical transformations involved in the functionalization of vinyl-terminated polypropylenes (bearing an allylic group, —$CH_2$—CH=$CH_2$ in the polymer chain end) by cross metathesis reaction with several representative polar vinyl compounds (e.g., acrylic acid, methyl acrylate) are illustrated in Scheme 3. This reaction scheme is described, for purpose of illustration, in two patent application publications US20090318647 and WO2009155517 by Hagadorn et al., the disclosure of each of which is incorporated herein by reference in its entirety.

Scheme 3. Cross Metathesis of Vinyl-Terminated Polypropylenes with Polar Vinyl Compounds.

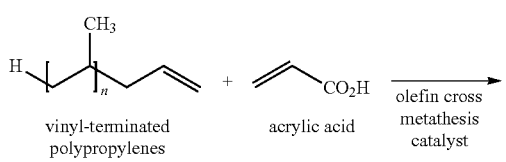

-continued

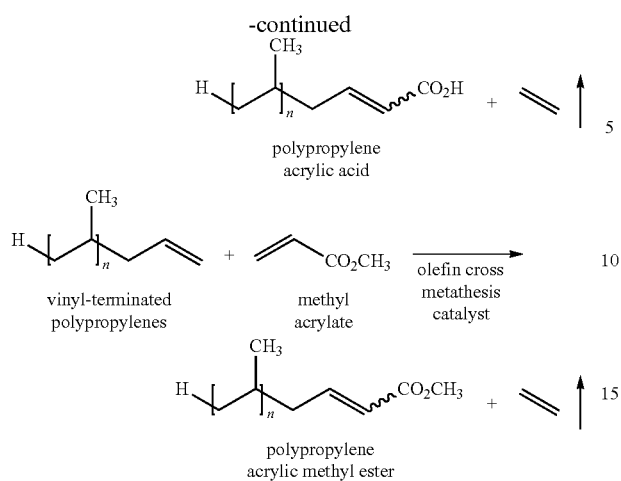

Using the synthesis of high vinyl-terminated polypropylenes by a metallocene process and their subsequent functionalization by cross metathesis reactions (as described in the above referenced patent applications), polymers terminally functionalized with carboxylic acid-polyamine are developed as antifoulants in the present application. For example, the carbon-carbon double bond in the polypropylene acrylic acid (or ester) cross metathesis products (as shown on the right-hand sides in Scheme 3) can be first saturated by a selective, catalytic hydrogenation step employing a catalyst such as palladium supported on activated carbon and a suitable inert solvent (e.g., cyclohexane) conducted under moderate hydrogen pressure at room temperature for several hours (Scheme 4). Under these reaction conditions the polar functional groups (carboxylic acid or ester) are unaffected (which can be confirmed by $^1$H NMR characterization and elemental analyses), and can be further used for reacting with a polyamine.

Scheme 4. Catalytic Hydrogenation of Double Bonds in Polypropylenes Funtionalized with Polar Carboxylic Acid or Ester Group in the Chain End via Cross Metathesis Reaction.

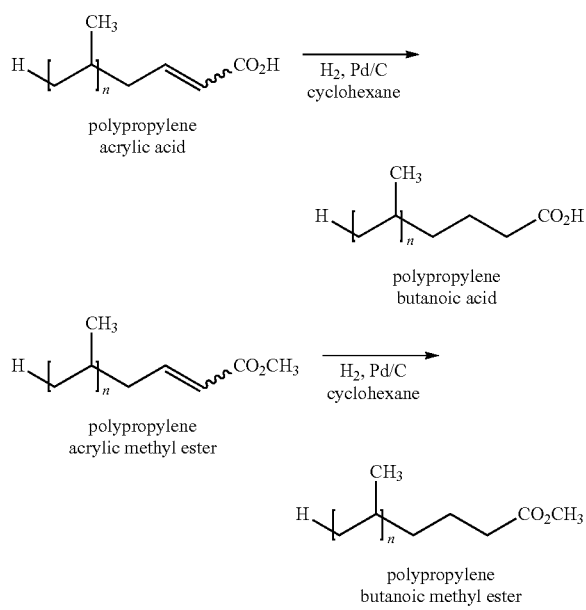

The next stage for preparing the antifoulants of the presently disclosed subject matter involves reacting the terminally acyl-functionalized polymer, e.g., the above-discussed polypropylene butanoic acid or ester (or the compounds before hydrogenation, i.e., polypropylene acrylic methyl ether or polypropylene acrylic acid), with polyamines (PAM) to provide an antifoulant additive consisting of a polymer terminally functionalized with polyamine with an amide linker group, e.g., PP-Acid-PAM amide, as depicted in Scheme 5.

Scheme 5. Condensation of Polypropylene Carboxylic Acid or Ester with Polyamines.

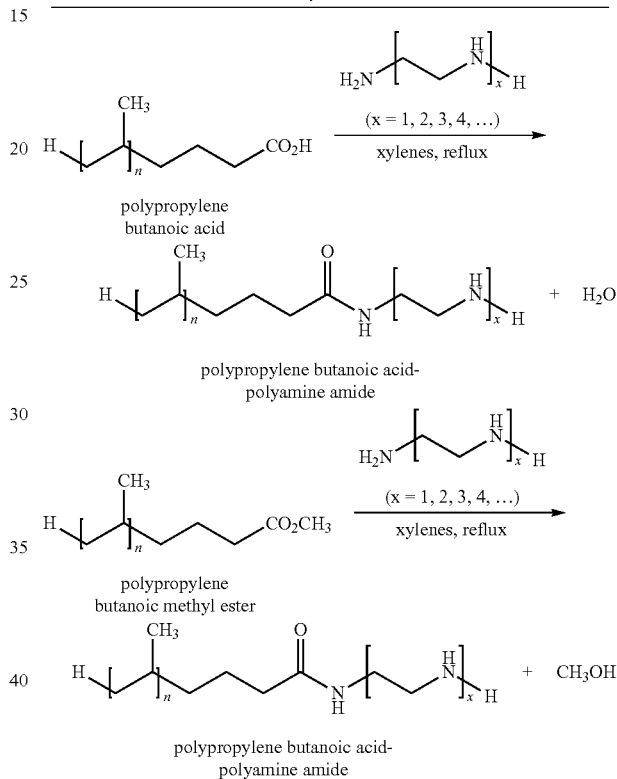

Examples of the polyamines suitable for use in the presently disclosed subject matter include, but are not limited to, polyethyleneamines with general molecular formula $H_2N(CH_2CH_2NH)_mH$ (where m=1, 2, 3, . . . ) such as ethylenediamine, diethylenetriamine (DETA), triethylenetetramine (TETA), tetraethylenepentamine (TEPA), pentaethylenehexamine (PEHA), hexaethyleneheptamine (HEHA), or higher molecular weight species, such as heavy polyamines or polyamine bottoms having greater number of nitrogens per molecule. In one embodiment, the polyamine can be "Heavy Polyamine X" or HPA-X available from Dow Chemical (Midland, Mich.). Other commercially available lower or higher polyamines with linear, branched, cyclic or heterocyclic structures can also be conveniently used. As understood by those skilled in the art, these polyamines can be mixtures of compounds comprised of molecules with a distribution of chain lengths, different level and type of amine (primary, secondary, and tertiary) functional groups, and varying degree of linear, branched and cyclic structures. This information is illustrated for tetraethylenepentamine below. As the molecular weight of polyamines increases, the number of possible isomers increases as well.

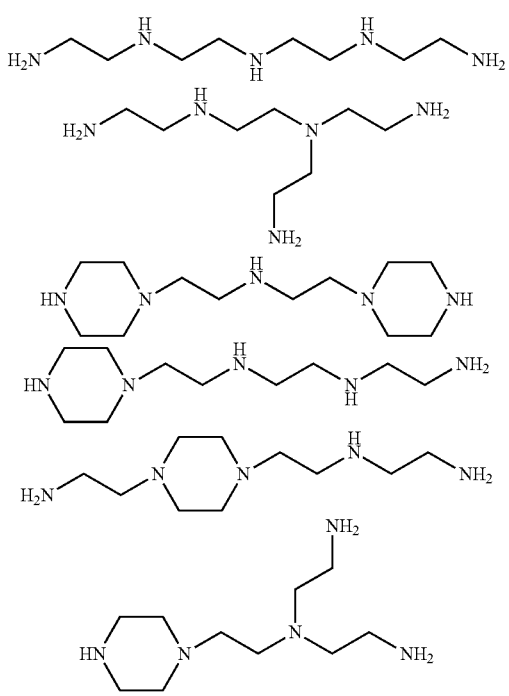

In some embodiments, the mole ratio between the polymer base unit $R_{11}$ and polyamine in the antifoulants prepared according to the above techniques ranges from about 5:1 to about 1:1, or from about 3:1 to about 1:1. By using polyamines containing more than one reactive amine groups per molecule, the polyamines can react with more than one molecule of terminally acyl-functionalized polymer under suitable conditions.

Furthermore, by selecting vinyl-terminated polypropylenes of different molecular weights ($M_n$) and molecular weight distribution (MWD) and polyamines of different chain lengths and molecular composition (e.g., ethylene amine oligomers with a general formula of $H_2N(CH_2CH_2NH)_mH$ or propylene amine oligomers with a formula of $H_2N(CH_2CH_2CH_2NH)_mH$ (where m=1, 2, 3, ...), these polypropylene-polyamine amide based dispersants can be molecularly designed to have different amount of basic nitrogen contents and hence varying degrees of dispersancy. Similar to the well-known polyisobutylene-succinic anhydride-polyamine family of dispersant additives, and not being bound by any particular theory, the polar head groups (i.e., polyamine) in the polypropylene carboxylic acid-polyamine amides are believed to be largely responsible for the ability of the antifoulants to disperse particulates in crude oils and these polyamines possess strongly basic amine groups for such effective dispersion. Other factors affecting the fouling prevention performance include, but are not limited to the type of polymer, molecular weights and distribution, type of polyamine used and amine group distribution in the composition of the resulting dispersant.

The above-described method for preparing an antifoulant by the hydrogenation of the terminally acrylic-functionalized polymer followed by amination is also encompassed in the currently disclosed subject matter.

The additives of the presently disclosed subject matter can be used in compositions that reduce fouling, including particulate-induced fouling. In addition to the additives of the presently disclosed subject matter, the compositions can further contain a hydrophobic oil solubilizer for the additive and/or a dispersant for the additive. Suitable solubilizers can include, for example, surfactants, carboxylic acid solubilizers, such as the nitrogen-containing phosphorous-free carboxylic solubilizers disclosed in U.S. Pat. No. 4,368,133, hereby incorporated by reference in its entirety. Also as disclosed in U.S. Pat. No. 4,368,133, hereby incorporated by reference in its entirety, surfactants that can be included in compositions of the presently disclosed subject matter can include, for example, cationic, anionic, nonionic or amphoteric type of surfactant. See, for example, McCutcheon's "Detergents and Emulsifiers", 1978, North American Edition, published by McCutcheon's Division, MC Publishing Corporation, Glen Rock, N.J., U.S.A., including pages 17-33, which is hereby incorporated by reference in its entirety.

The compositions of the presently disclosed subject matter can further include a boronating agent. The boronating agent can be any one or more compounds selected from boric acid, an ortho-borate, or a meta-borate, for example, boric acid, trimethyl metaborate (trimethoxyboroxine), triethyl metaborate, tributyl metaborate, trimethyl borate, triethylborate, triisopropyl borate (triisopropoxyborane), tributyl borate (tributoxyborane) and tri-t-butyl borate. Other boronating agents can be used, such as those disclosed in co-pending application U.S. Ser. No. 12/533,465, filed Jul. 31, 2009, and published as U.S. 2010/0038290, which is hereby incorporated by reference in its entirety.

The compositions of the presently disclosed subject matter can further include, for example, viscosity index improvers, anti-foamants, antiwear agents, demulsifiers, anti-oxidants, and other corrosion inhibitors.

Furthermore, the additives or compositions of the presently disclosed subject matter can be added with other compatible components that address other problems that can present themselves in an oil refining process known to one of ordinary skill in the art.

Uses of the Additives and Compositions of the Presently Disclosed Subject Matter in a Refinery Process Another aspect of the presently disclosed subject matter provides a system for refining hydrocarbons that includes at least one crude hydrocarbon refinery component, in which the crude hydrocarbon refinery component includes an additive selected from any one of the additives described herein. The crude hydrocarbon refining component can be selected from a heat exchanger, a furnace, a crude preheater, a coker preheater, a FCC slurry bottom, a debutanizer exchanger, a debutanizer tower, a feed/effluent exchanger, a furnace air preheater, a flare compressor component, a steam cracker, a steam reformer, a distillation column, a fractionation column, a scrubber, a reactor, a liquid-jacketed tank, a pipestill, a coker, and a visbreaker. In one preferred embodiment, the crude hydrocarbon refining component is a heat exchanger (e.g., a crude pre-heat train heat exchanger).

The additives of the presently disclosed subject matter are generally soluble in a typical hydrocarbon refinery stream and can thus be added directly to the process stream, alone or in combination with other additives that either reduce fouling or improve some other process parameter.

The additives can be introduced, for example, upstream from the particular crude hydrocarbon refinery component(s) (e.g., a heat exchanger) in which it is desired to prevent fouling (e.g. particulate-induced fouling). Alternatively, the additive can be added to the crude oil prior to being introduced to the refining process, or at the very beginning of the refining process.

It is noted that water can have a negative impact on boron-containing additives. Accordingly, it is advisable to add boron-containing additives at process locations that have a minimal amount of water.

While not limited thereto, the additives of the presently disclosed subject matter are particularly suitable in reducing or preventing particulate-induced fouling. Thus one aspect of the presently disclosed subject matter provides a method of reducing and/or preventing, in particular, particulate-induced fouling that includes adding at least one additive of the presently disclosed subject matter to a process stream that is known, or believed to contribute to, particulate-induced fouling. To facilitate determination of proper injection points, measurements can be taken to ascertain the particulate level in the process stream. Thus, one embodiment of the presently disclosed subject matter includes identifying particular areas of a refining process that have relatively high particulate levels, and adding any one of the additives of the presently disclosed subject matter in close proximity to these areas (e.g., just upstream to the area identified as having high particulate levels).

In one embodiment of the presently disclosed subject matter, a method to reduce fouling is provided comprising adding any one of the above-mentioned antifouling additives or compositions to a crude hydrocarbon refinery component that is in fluid communication with a process stream that contains, at least 25 or 50 wppm of particulates, including organic and inorganic particulates. In another embodiment of the presently disclosed subject matter, a method to reduce fouling is provided comprising adding any one of the above-mentioned antifouling additives or compositions to a crude hydrocarbon refinery component that is in fluid communication with a process stream. In another embodiment of the presently disclosed subject matter, a method to reduce fouling is provided comprising adding any one of the above-mentioned additives to a crude hydrocarbon refinery component that is in fluid communication with a process stream that contains at least 250 wppm (or 1000 wppm, or 10,000 wppm) of particulates, including organic and inorganic particulates, as defined above.

In one embodiment of the presently disclosed subject matter, the additives or compositions of the presently disclosed subject matter are added to selected crude oil process streams known to contain, or possibly contain, problematic amounts of organic or inorganic particulate matter (e.g. 1-10,000 wppm), such as inorganic salts. Accordingly, the additives of the presently disclosed subject matter can be introduced far upstream, where the stream is relatively unrefined (e.g. the refinery crude pre-heat train). The additives can be also added, for example, after the desalter to counteract the effects of incomplete salt removal or to the bottoms exit stream from the fractionation column to counteract the high temperatures that are conducive to fouling.

Other applications and uses of the antifoulants and antifoulant compositions of the presently disclosed subject matter are contemplated. For example and not limitation, the antifoulants and antifoulant compositions can be used as dispersant for treating oil spill, additives in fuel compositions, lubricating oil dispersants for dispersion of sludge/soot/particulate in lubricating oil, fuel additives for cleaning up or preventing deposits in fuel storage tank and fuel injection systems.

FIG. 1 demonstrates possible additive injection points within the refinery crude pre-heat train for the additives of the presently disclosed subject matter, wherein the numbered circles represent heat exchangers. As shown in FIG. 1, the additives can be introduced in crude storage tanks and at several locations in the preheat train. This includes at the crude charge pump (at the very beginning of the crude pre-heat train), and/or before and after the desalter, and/or to the bottoms stream from a flash drum.

The total amount of additive to be added to the process stream can be determined by a person of ordinary skill in the art. In one embodiment, up to about 1000 wppm of additive is added to the process stream. For example, the additive can be added such that its concentration, upon addition, is about 50 ppm, 250 ppm or 500 ppm. More or less additive can be added depending on, for example, the amount of particulate in the stream, the $\Delta T$ associated with the particular process and the degree of fouling reduction desired in view of the cost of the additive.

The additives or compositions of the presently disclosed subject matter can be added in a solid (e.g., powder or granules) or liquid form directly to the process stream. As mentioned above, the additives or compositions can be added alone, or combined with other components to form a composition for reducing fouling (e.g., particulate-induced fouling). Any suitable technique can be used for adding the additive to the process stream, as known by a person of ordinary skill in the art in view of the process to which it is employed. As a non-limiting example, the additives or compositions can be introduced via injection that allows for sufficient mixing of the additive and the process stream.

EXAMPLES

The presently disclosed subject matter is further described by means of the examples, presented below. The use of such examples is illustrative only and in no way limits the scope and meaning of the disclosed subject matter or of any exemplified term. Likewise, the presently disclosed subject matter is not limited to any particular preferred embodiments described herein. Indeed, many modifications and variations of the presently disclosed subject matter will be apparent to those skilled in the art upon reading this specification. The presently disclosed subject matter is therefore to be limited only by the terms of the appended claims along with the full scope of equivalents to which the claims are entitled.

Example 1

Preparation of Antifoulants of the Presently Disclosed Subject Matter

A. General Procedure for Hydrogenation of Polypropylene Acrylic Acid or Methyl Ester to Polypropylene Butanoic Acid or Methyl Ester Example 1.1

Hydrogenation of Polypropylene Acrylic Acid to Polypropylene Butanoic Acid

The following procedure was used to carry out the hydrogenation of polypropylene acrylic acid (PPAA). To a 300 cc autoclave equipped for stirring and gas flow through 6.08 g of a PPAA polymer pre-mixed with 100 ml of cyclohexane solvent was added along with 0.5 g of Pd on carbon catalyst (5% Pd). The system was then flushed with nitrogen to remove air. Finally the autoclave was charged to 200 psig with hydrogen and mixed at 1300 rpm for six hours at room temperature. The autoclave was vented and the reacted mixture was then filtered through Celite® to remove the catalyst. The mixture was then concentrated on a rotary evaporator to remove the cyclohexane solvent and the hydrogenated clear polymer product was recovered. Complete hydrogenation was confirmed by proton NMR. This sample has a carboxylic acid content of 0.972 mmol/g and a number-averaged molecular weight (by $^1$H NMR) of 976 g/mol (MO, assuming one carboxylic acid group per polymer chain.

Example 1.2

Hydrogenation of Polypropylene Acrylic Acid to Polypropylene Butanoic Acid

To a 300 cc autoclave equipped for stirring and gas flow through 22.6 g of a PPAA polymer pre-mixed with 100 ml of cyclohexane solvent was added along with 0.79 g of Pd on carbon catalyst (5% Pd). The system was then flushed with nitrogen to remove air. Finally the autoclave was charged to 200 psig with hydrogen and mixed at 1300 rpm for six hours at room temperature. The autoclave was vented and the reacted mixture was then filtered through Celite® to remove the catalyst. The mixture was then was then concentrated on a rotary evaporator to remove the cyclohexane solvent and the hydrogenated clear polymer product was recovered. Complete hydrogenation was confirmed by proton NMR. This sample has a carboxylic acid content of 0.375 mmol/g and a number-averaged molecular weight (by $^1$H NMR) of 2154 g/mol (Mn) assuming one carboxylic acid group per polymer chain.

Example 1.3

Hydrogenation of Polypropylene Acrylic Acid to Polypropylene Butanoic Acid

A viscous PPAA polymer (6.0 g) was heated to 150° C. and pre-mixed at room temperature with 50 ml of cyclohexane before adding to the autoclave. An additional 50 ml of cyclohexane was added and then the mixture was hydrogenated as in Example 1.1. Complete hydrogenation and the structure of the product was confirmed by proton NMR. This sample has a carboxylic acid content of 0.166 mmol/g and a number-averaged molecular weight (by $^1$H NMR) of 4876 g/mol (Mn) assuming one carboxylic acid group per polymer chain.

Example 1.4

Hydrogenation of Polypropylene Acrylic Methyl Ester Polymer to Polypropylene Butanoic Methyl Ester To a 300 cc autoclave equipped for stirring and gas flow through 15.56 g of a polypropylene acrylic methyl ester pre-mixed with 100 ml of cyclohexane solvent was added along with 1.02 g of Pd on carbon catalyst (5% Pd). The mixture was hydrogenated as in Example 1.1 at 450 psig of hydrogen pressure for 7 hours at room temperature. Complete hydrogenation and the structure of the product was confirmed by proton NMR. This sample has a carboxylic ester content of 0.525 mmol/g and a number-averaged molecular weight (by $^1$H NMR) of 2408 g/mol ($M_n$) assuming one carboxylic ester group per polymer chain.

B. General Procedure for Condensation of Polypropylene Butanoic Acid with Polyamine to Prepare Polypropylene Carboxylic Acid-Polyamine Amide Example 1.5

A mixture of polypropylene butanoic acid from Example 1.1 in the hydrogenation experiment (3.00 g, 2.916 mmol of $CO_2H$ group), tetraethylenepentamine (0.45 g, 2.38 mmol, 0.82 equiv.) and xylenes (50 ml) was heated at reflux (oil bath temperature 175° C.) under a nitrogen atmosphere for 72 hr. A Dean-Stark trap was used to collect any water formed in the condensation reaction. After the reaction was completed, the mixture was allowed to cool to room temperature, and excess xylenes was removed initially on a rotary evaporator followed by heating under high vacuum to afford a light brown oil (Additive A, 3.20 g) as crude product. The structure and purity of the crude product was established by $^1$H and $^{13}$C NMR ($CDCl_3$, 400 and 100 MHz, respectively), which confirmed complete conversion of the carboxylic acid group to the corresponding amide linkage. This sample has a nitrogen content of 4.34% based on elemental analysis.

Example 1.6

A mixture of polypropylene butanoic acid from Example 1.2 in the hydrogenation experiment (6.00 g, 2.25 mmol of $CO_2H$ group), tetraethylenepentamine (0.34 g, 1.80 mmol, 0.80 equiv.) and xylenes (50 ml) was heated at reflux (oil bath temperature 175° C.) under a nitrogen atmosphere for 72 hr. A Dean-Stark trap was used to collect any water formed in the condensation reaction. After the reaction was completed, the mixture was allowed to cool to room temperature, and excess xylenes was removed initially on a rotary evaporator followed by heating under high vacuum to afford a light brown viscous oil (Additive B, 6.16 g) as crude product. The structure and purity of the crude product was established by $^1$H and $^{13}$C NMR which confirmed conversion of the carboxylic acid group to the corresponding amide linkage. This sample has a nitrogen content of 1.91% based on elemental analysis.

Example 2

Fouling Reduction Measured in the Alcor HLPS (Hot Liquid Process Simulator)

Figure 2:
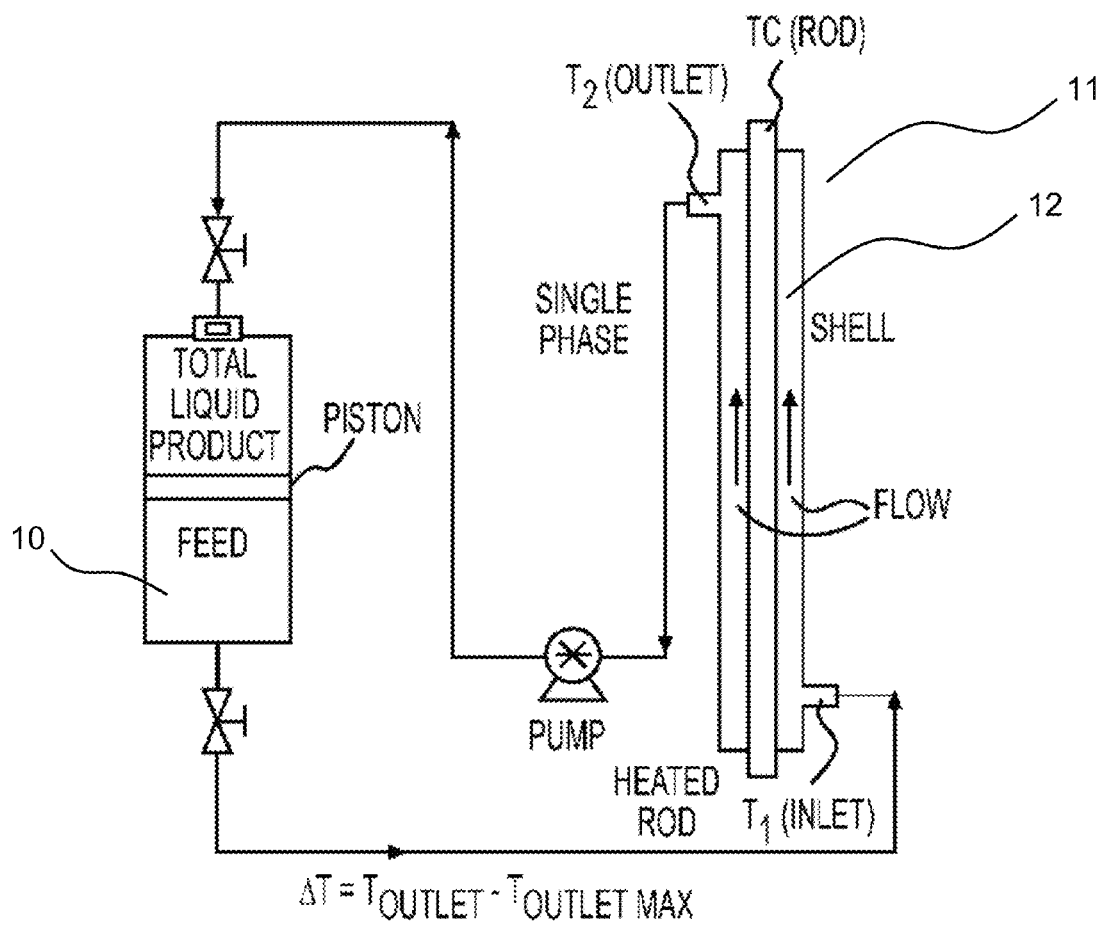
FIG. 2 is a schematic of the Alcor Hot Liquid Process Simulator (HLPS) employed in Example 2 of the present application.

FIG. 2 depicts an Alcor HLPS (Hot Liquid Process Simulator) testing apparatus used to measure the impact of addition of particulates to a crude oil on fouling and the impact the addition of an additive of the presently disclosed subject matter has on the mitigation of fouling. The testing arrangement includes a reservoir 10 containing a feed supply of crude oil. The feed supply of crude oil can contain a base crude oil containing a whole crude or a blended crude containing two or more crude oils. The feed supply is heated to a temperature of approximately 150° C./302° F. and then fed into a shell 11 containing a vertically oriented heated rod 12. The heated rod 12 is formed from carbon-steel (1018). The heated rod 12 simulates a tube in a heat exchanger. The heated rod 12 is electrically heated to a surface temperature of 370° C./698° F. or 400° C./752° F. and maintained at such temperature during the trial. The feed supply is pumped across the heated rod 12 at a flow rate of approximately 3.0 mL/minute. The spent feed supply is collected in the top section of the reservoir 10. The spent feed supply is separated from the untreated feed supply oil by a sealed piston, thereby allowing for once-through operation. The system is pressurized with nitrogen (400-500 psig) to ensure gases remain dissolved in the oil during the test. Thermocouple readings are recorded over the course of simulated test runs for the bulk fluid inlet and outlet temperatures and for surface of the rod 12.

Figure 3:
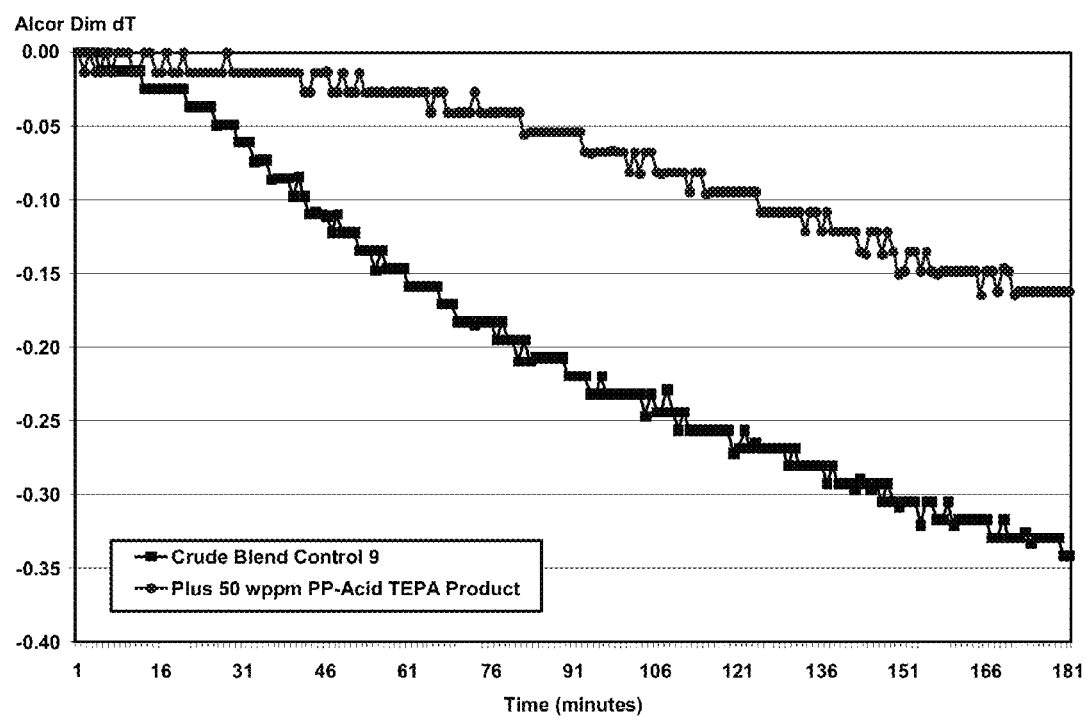
FIG. 3 is a graph demonstrating the effects of fouling of a control crude oil blend sample and the crude oil blend sample treated with 50 wppm of a polypropylene carboxylic acid polyamine (PP-CA-PAM) additive, as measured by the Alcor HLPS apparatus depicted in FIG. 2.

FIG. 3 illustrates the impact of fouling of a refinery component over 180 minutes at a rod surface temperature of 370° C. Two blends were tested in the Alcor unit: a crude oil control (control blend 9) containing added rust (iron oxide) particles (200 wppm) in the absence of an additive, and the same stream with the addition of 50 wppm of a PP-CA-PAM additive, i.e., Additive A as prepared in Example 1.5, above. As FIG. 3 demonstrates, the reduction in the outlet temperature over time (due to fouling) is less for the process blend containing 50 wppm of additive as compared to the crude oil control without the additive. This indicates that the PP-CA-PAM is effective for reducing fouling of a heat exchanger.

Figure 4:
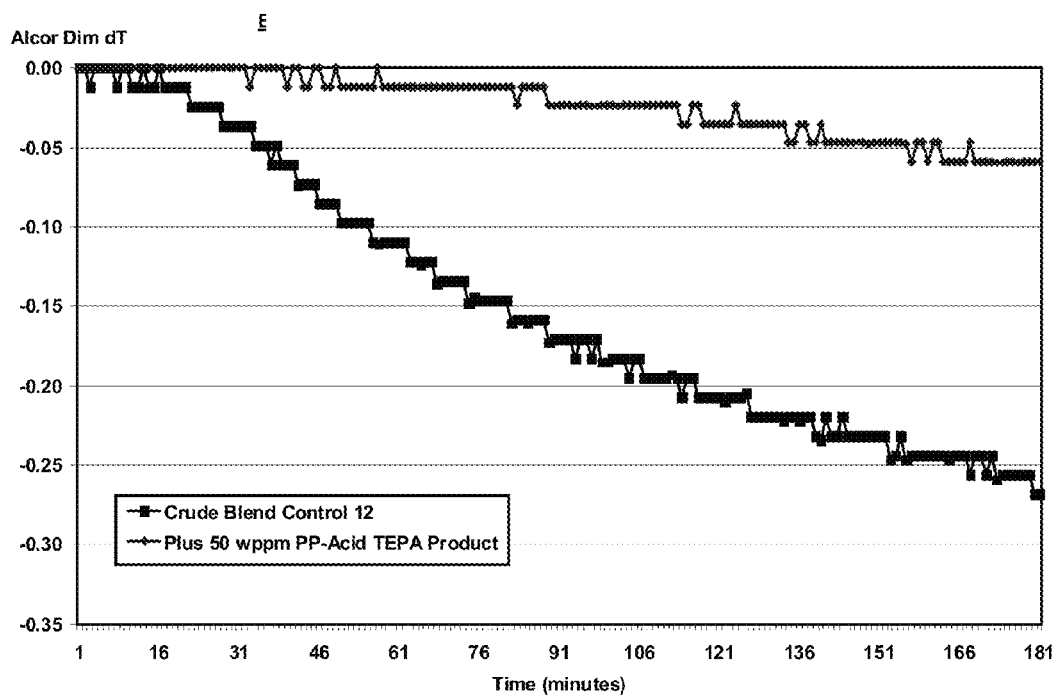
FIG. 4 is a graph demonstrating the effects of fouling of a control crude oil blend sample and the crude oil blend sample treated with 50 wppm of another polypropylene carboxylic acid polyamine (PP-CA-PAM) additive, as measured by the Alcor HLPS apparatus depicted in FIG. 2.

FIG. 4 demonstrates the results of the Alcor test at a rod surface temperature of 370° C., using another crude oil control (control blend 12) and the control with the addition of 50 wppm of another PP-CA-PAM additive, i.e., Additive B as prepared in Example 1.6, above. As FIG. 4 indicates, this PP-CA-PAM was also effective for reducing fouling.

The presently disclosed subject matter is not to be limited in scope by the specific embodiments described herein. Indeed, various modifications of the disclosed subject matter in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosure of each of which is incorporated herein by reference in its entirety for all purposes.

The invention claimed is:

1. A method for reducing fouling in a hydrocarbon refining process comprising
providing a crude hydrocarbon for a refining process;
adding an additive to the crude hydrocarbon, the additive represented by the formula:

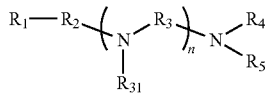

wherein $R_1$ is a branched or straight-chained $C_{64}$-$C_{342}$ alkyl or alkenyl group;
$R_2$ is

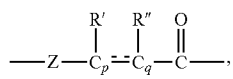

wherein the carbonyl carbon connects to nitrogen, the bond between carbons $C_p$ and $C_q$ is either a single or double bond, wherein when the bond between carbons $C_p$ and $C_q$ is a single bond, a hydrogen is attached to each of $C_p$ and $C_q$ as required by valency; R' and R" are independently H or unsubstituted or substituted $C_1$-$C_4$ alkyl or $C_1$-$C_4$ alkenyl, and Z is a bond or unsubstituted or substituted $C_1$-$C_4$ alkylene;
$R_3$ is a $C_1$-$C_{10}$ branched or straight chained alkylene group;
n is an integer from 1 to 10;
$R_4$ and $R_5$ are both independently selected from hydrogen and —$R_6$-$R_7$, wherein $R_6$ is defined the same as $R_2$ above, and $R_7$ is a $C_{64}$-$C_{342}$ branched or straight chained alkyl or alkenyl group, or one of $R_4$ and $R_5$ is absent as required by valency and the other of $R_4$ and $R_5$ is hydrogen or —$R_6$-$R_7$ as defined above;
$R_{31}$ is hydrogen or —$R_8$-$R_9$, wherein $R_8$ is defined the same as $R_2$ above, and $R_9$ is branched or straight-chained $C_{64}$-$C_{342}$ alkyl or alkenyl group, or $R_8$ and $R_9$ together are a $C_1$-$C_{10}$ branched or straight chained alkyl group optionally substituted with one or more amine groups;
and wherein the —N($R_{31}$)—$R_3$— repeat unit is optionally interrupted in one or more places by a heterocyclic or homocyclic cycloalkyl group.

2. The method of claim 1, wherein at least one of $R_1$, $R_7$, and $R_9$ comprises polypropylene.

3. The method of claim 2, wherein the polypropylene is atactic polypropylene, isotactic polypropylene, or syndiotactic polypropylene.

4. The method of claim 2, wherein the polypropylene is amorphous.

5. The method of claim 2, wherein the polypropylene include isotactic or syndiotactic crystallizable units.

6. The method of claim 2, wherein the polypropylene include meso diads constituting from about 30% to about 99.5% of the total diads of the polypropylene.

7. The method of claim 2, wherein at least one of $R_1$, $R_7$, and $R_9$ has a number-averaged molecular weight of from about 300 to about 30000 g/mol.

8. The method of claim 2, wherein at least one of $R_1$, $R_7$, and $R_9$ has a number-averaged molecular weight of from about 500 to about 5000 g/mol.

9. The method of claim 1, wherein at least one of $R_1$, $R_7$, and $R_9$ comprises polyethylene.

10. The method of claim 1, wherein at least one of $R_1$, $R_7$, and $R_9$ comprises poly(ethylene-co-propylene).

11. The method of claim 10, wherein at least one of $R_1$, $R_7$, and $R_9$ comprises from about 1 mole % to about 90 mole % of ethylene units and from about 99 mole % to about 10 mole % propylene units.

12. The method of claim 11, wherein at least one of $R_1$, $R_7$, and $R_9$ comprises from about 10 mole % to about 50 mole % of ethylene units.

13. The method of claim 1, wherein $R_1$ is poly(ethylene-co-propylene), $R_3$ is —$CH_2CH_2$—, $R_{31}$ is hydrogen, and $R_4$ and $R_5$ are both hydrogen.

14. The method of claim 1, wherein $R_2$ is —$CH_2$—$CH_2$—$C(O)$—.

15. The method of claim 1, wherein the nitrogen content in the additive is about wt % to about 10 wt % based on the total weight of the additive.

16. A method for reducing fouling in a hydrocarbon refining process comprising
providing a crude hydrocarbon for a refining process;
adding an additive to the crude hydrocarbon, the additive being a reaction product of
(a) a polymer base unit $R_{11}$, which is a branched or straight-chained $C_{64}$-$C_{342}$ alkyl or alkenyl group having a vinyl terminal group;
(b) an acrylic compound represented by $H_2C=CH-C(O)-Y$, wherein Y is a functional group selected from halogen, —R*, —OR*, —SR*, —NR*R**, where R* and R** are both independently selected from hydrogen and substituted or unsubstituted $C_1$-$C_{10}$ alkyl or $C_1$-$C_{10}$ alkenyl, and wherein a hydrogen connecting to either of the carbons forming the double bond may be optionally replaced by a $C_1$-$C_4$ alkyl;

(c) optionally, hydrogen;
(d) a polyamine represented by the formula:

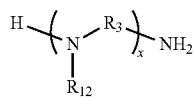

wherein $R_{12}$ is hydrogen or a $C_1$-$C_{10}$ branched or straight chained alkyl optionally substituted with one or more amine groups, $R_{13}$ is a $C_1$-$C_{10}$ branched or straight chained alkylene group, and x is an integer between 1 and 10, wherein the —N($R_{12}$)—$R_{13}$— unit is optionally interrupted in one or more places by a heterocyclic or homocyclic cycloalkyl group, and wherein when the —N($R_{12}$)—$R_{13}$— unit along with the terminal nitrogen atom forms a heterocyclic cycloalkyl group at the right terminal end, the terminal —$NH_2$ is replaced by a —NH— group as required by valency.

17. The method of claim 16, wherein the polyamine is selected from ethylenediamine, diethylenetriamine, triethylenetetramine, tetraethylenepentamine, pentaethylenehexamine, and hexaethyleneheptamine.

18. The method of claim 16, wherein the polyamine is a heavy polyamine.

19. The method of claim 16, wherein $R_{11}$ comprises polypropylene.

20. The method of claim 16, wherein the molar ratio of $R_{11}$:polyamine ranges from about 5:1 to about 1:1.

21. The method of claim 19, wherein $R_{11}$ has a number-averaged molecular weight of from about 300 to about 30000 g/mol.

22. The method of claim 21, wherein $R_{11}$ has a number-averaged molecular weight of from about 500 to about 5000 g/mol.

23. The method of claim 19, wherein the polypropylene is atactic polypropylene, isotactic polypropylene, or syndiotactic polypropylene.

24. The method of claim 19, wherein the polypropylene is amorphous.

25. The method of claim 19, wherein the polypropylene include isotactic or syndiotactic crystallizable units.

26. The method of claim 19, wherein the polypropylene include meso diads constituting from about 30% to about 99.5% of the total diads of the polypropylene.

27. The method f claim 16, wherein $R_{11}$ comprises polyethylene.

28. The method of claim 16, wherein $R_{11}$ comprises poly(ethylene-co-propylene).

29. The method of claim 28, wherein $R_{11}$ comprises from about 10 mole % to about 90 mole % of ethylene units and from about 90 mole % to about 10 mole % propylene units.

30. The method of claim 29, wherein $R_{11}$ comprises from about 20 mole % to about 50 mole % of ethylene units.

31. The method of claim 29, wherein the acrylic compound is acrylic acid or methacrylic acid.

32. The method of claim 16, wherein acrylic compound in (a) is a ($C_1$-$C_4$) acrylate or a ($C_1$-$C_4$)alkyl methacrylate.

33. The method of claim 32, wherein the acrylic compound in (a) is selected from methyl acrylate, methyl methacrylate, ethyl acrylate, and ethyl methacrylate.

34. The method of claim 16, wherein at least 50% of the terminal vinyl groups of $R_{11}$ are an allylic vinyl group.

\* \* \* \* \*